(12) United States Patent
Miao

(10) Patent No.: US 11,738,634 B2
(45) Date of Patent: Aug. 29, 2023

(54) POWER ASSEMBLY WITH HEAT CONDUCTIVE ELEMENT BETWEEN STATOR AND TRANSMISSION HOUSING

(71) Applicant: SEGWAY TECHNOLOGY CO., LTD., Jiangsu (CN)

(72) Inventor: Shulin Miao, Jiangsu (CN)

(73) Assignee: SEGWAY TECHNOLOGY CO., LTD., Jiangsu (CN)

( * ) Notice: Subject to any disclaimer, the term of this patent is extended or adjusted under 35 U.S.C. 154(b) by 237 days.

(21) Appl. No.: 17/319,348

(22) Filed: May 13, 2021

(65) Prior Publication Data
US 2021/0354539 A1 Nov. 18, 2021

(30) Foreign Application Priority Data
May 13, 2020 (CN) .......................... 202020787645.5

(51) Int. Cl.
*H02K 5/18* (2006.01)
*H02K 9/22* (2006.01)
(Continued)

(52) U.S. Cl.
CPC .............. *B60K 11/06* (2013.01); *B60K 17/08* (2013.01); *B60K 17/16* (2013.01); *H02K 5/18* (2013.01);
(Continued)

(58) Field of Classification Search
CPC .. B60K 11/06; B60K 2001/001; B60K 17/08; B60K 17/16; H02K 5/18; H02K 5/20;
(Continued)

(56) References Cited

U.S. PATENT DOCUMENTS 6,169,345 B1 * 1/2001 Bloch .................... H02K 7/116
310/67 R
6,329,731 B1 * 12/2001 Arbanas ................. H02K 7/116
310/58
(Continued)

FOREIGN PATENT DOCUMENTS

CN 212677022 U 3/2021
EP 2325032 A2 5/2011
(Continued)

OTHER PUBLICATIONS

European Patent Office, Search Report for EP application 21173826.5, dated Jul. 10, 2021.
(Continued)

*Primary Examiner* — Michael Andrews
(74) *Attorney, Agent, or Firm* — Timothy W. Menasco, Esq.; Harter Secrest & Emery LLP

(57) ABSTRACT

A power assembly includes a transmission, a motor and a heat conductive element. The transmission includes a transmission housing and a transmission input shaft rotatably connected to the transmission housing, and the transmission housing has a through hole. The motor includes: a motor housing having an open end and a closed end opposite to the open end, and the open end being connected to the transmission housing; a rotor rotatably arranged in the motor housing; a motor output shaft having an end connected to the rotor and another end passing through the through hole to be connected to the transmission input shaft; and a stator fixed in the motor housing and arranged on a peripheral outer side of the rotor. The heat conductive element is arranged between an end of the stator and the transmission housing.

16 Claims, 4 Drawing Sheets

(51) Int. Cl.
  *B60K 11/06* (2006.01)
  *B60K 17/08* (2006.01)
  *B60K 17/16* (2006.01)
  *H02K 5/20* (2006.01)
  *H02K 9/02* (2006.01)
  *B60K 1/00* (2006.01)

(52) U.S. Cl.
  CPC ............... *H02K 5/20* (2013.01); *H02K 9/02* (2013.01); *H02K 9/22* (2013.01); *B60K 2001/001* (2013.01)

(58) Field of Classification Search
  CPC ............ H02K 9/02; H02K 9/22; H02K 9/223; H02K 7/116
  USPC .......................................................... 310/52
  See application file for complete search history.

(56) References Cited

U.S. PATENT DOCUMENTS

| | | | | |
|---|---|---|---|---|
| 2007/0007830 | A1* | 1/2007 | Reisch | H02K 7/006 310/52 |
| 2010/0320849 | A1* | 12/2010 | Wilton | B60K 6/52 74/421 A |
| 2011/0232786 | A1* | 9/2011 | Matsushita | F16H 57/0476 137/565.11 |
| 2013/0249356 | A1 | 9/2013 | Nakano | |
| 2013/0300222 | A1* | 11/2013 | Nakano | H02K 3/50 310/43 |
| 2015/0288241 | A1* | 10/2015 | Mahler | H02K 15/02 310/260 |
| 2021/0354539 | A1 | 11/2021 | Miao | |
| 2021/0394600 | A1* | 12/2021 | Absenger | F16H 57/045 |

FOREIGN PATENT DOCUMENTS

| | | |
|---|---|---|
| EP | 3910765 A1 | 11/2021 |
| WO | 2020069744 A1 | 4/2020 |

OTHER PUBLICATIONS

Canadian Intellectual Property Office, Office Action for CA application 3,118,250, dated Aug. 26, 2022.

* cited by examiner

POWER ASSEMBLY WITH HEAT CONDUCTIVE ELEMENT BETWEEN STATOR AND TRANSMISSION HOUSING

CROSS-REFERENCE TO RELATED APPLICATION

This application claims the benefit of priority to Chinese patent Application No. 202020787645.5, filed on May 13, 2020, the content of which is incorporated herein by reference in its entirety.

TECHNICAL FIELD

The present disclosure relates to an electromechanical field, in particular to a power assembly and an all-terrain vehicle having the same.

BACKGROUND

For the pursuit of better dynamic performance and energy source diversity, it gradually becomes a trend to drive a mechanical device by a motor. The motor needs to be cooled by a cooling system so as to avoid overheat of the motor. The related cooling system cools the motor by arranging a cooling channel in a motor housing, while an end of a stator of the motor cannot exchange heat with a cooling liquid in the cooling channel, so that the temperature of the end of the stator of the motor is higher than those of other parts of the stator, i.e., the temperature of the stator is uneven. Thus, the increase of output power of the motor is limited.

The related cooling system solves the uneven temperature of the stator by directly spraying or splashing the cooling liquid onto the end of the stator. However, the stator needs to possess a cooling liquid resistance as the cooling liquid directly touches the stator, and also, a spraying system needs to be added, thus increasing a manufacturing cost of a power assembly.

SUMMARY

Embodiments of a first aspect of the present disclosure provide a power assembly. The power assembly includes a transmission and a motor. The transmission includes a transmission housing and a transmission input shaft rotatably connected to the transmission housing, and the transmission housing has a through hole. The motor includes: a motor housing having an open end and a closed end opposite to the open end, and the open end being connected to the transmission housing; a rotor rotatably arranged in the motor housing; a motor output shaft having an end connected to the rotor and another end passing through the through hole to be connected to the transmission input shaft; and a stator fixed in the motor housing and arranged on a peripheral outer side of the rotor. The heat conductive element is arranged between an end of the stator and the transmission housing.

Embodiments of a second aspect of the present disclosure provide an all-terrain vehicle. The all-terrain vehicle includes a wheel and a power assembly. The power assembly is connected to the wheel and configured to drive the wheel to rotate. The power assembly includes a transmission and a motor. The transmission includes a transmission housing and a transmission input shaft rotatably connected to the transmission housing, and the transmission housing has a through hole. The motor includes: a motor housing having an open end and a closed end opposite to the open end, and the open end being connected to the transmission housing; a rotor rotatably arranged in the motor housing; a motor output shaft having an end connected to the rotor and another end passing through the through hole to be connected to the transmission input shaft; and a stator fixed in the motor housing and arranged on a peripheral outer side of the rotor. The heat conductive element is arranged between an end of the stator and the transmission housing.

It is to be understood that both the foregoing general description and the following detailed description are illustrative and explanatory only and are not restrictive of the present disclosure, as claimed.

DETAILED DESCRIPTION

All specific technical features in all examples described in specific embodiments may be combined in various ways under no contradictions, for example, different specific technical features may be combined to form different embodiments. To avoid unnecessary repetition, various possible combinations of all specific technical features in the present disclosure are not described separately.

In a specific embodiment, a power assembly may be a power assembly for any mechanical device to drive the mechanical device. For example, the power assembly may be a power assembly for a spindle of a lathe to drive the spindle of the lathe to rotate. For example, the power assembly may also be a power assembly for a drilling machine to drive a drill to rotate. For example, the power assembly may also be a power assembly for an all-terrain vehicle to drive wheels of the all-terrain vehicle to rotate so as to drive the all-terrain vehicle to move. To facilitate description, that the power assembly is the power assembly for the all-terrain vehicle is taken as an example.

Figure 1:
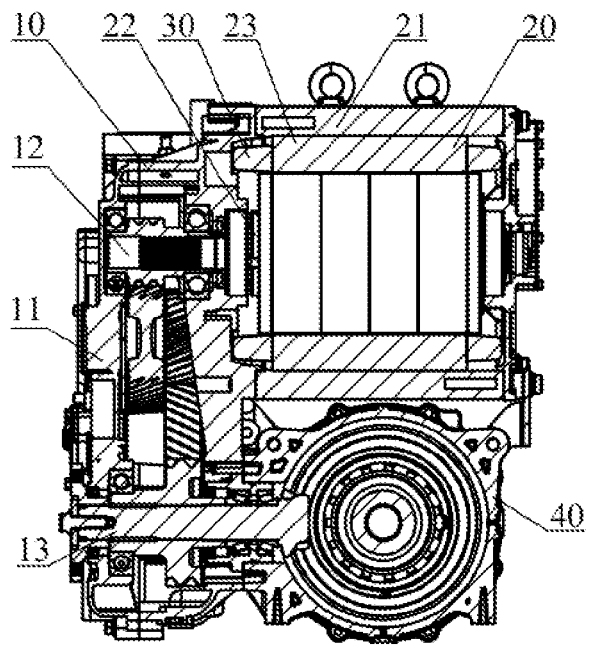
FIG. 1 is a sectional view of a power assembly according to an embodiment of the present disclosure.
Figure 2:
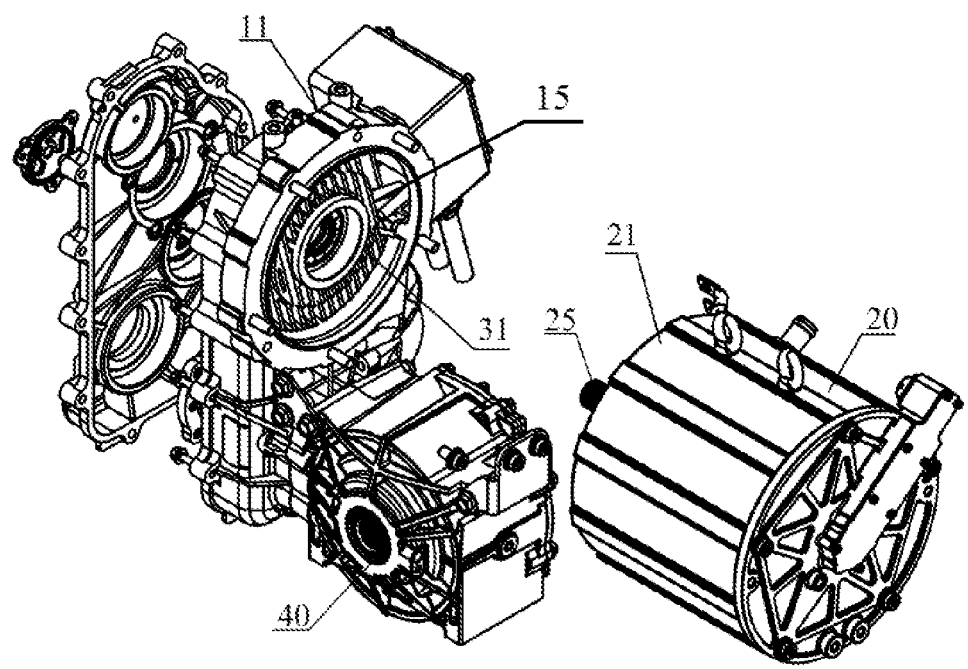
FIG. 2 is an exploded view of a power assembly according to an embodiment of the present disclosure.

Referring to FIG. 1 and FIG. 2, a power assembly 1 may include: a transmission 10, a motor 20, a heat conductive element 30 and a differential 40. The transmission 10 includes a transmission housing 11, a transmission input shaft 12 and a transmission output shaft 13. The transmission input shaft 12 is arranged in the transmission housing 11 and rotatably connected to the transmission housing 11. A through hole is formed in the transmission housing 11. An output shaft of the motor 20 passes through the through hole to be connected to the transmission input shaft 12, so as to transmit power to the transmission input shaft 12. The transmission output shaft 13 is arranged in the transmission housing 11, and the transmission output shaft 13 is rotatably connected to the transmission housing 11. A plurality of first gears are arranged on the transmission input shaft 12. A plurality of second gears are arranged on the transmission output shaft 13. The first gears and the second gears may be meshed to form a plurality of gear transmission pairs. The transmission input shaft 12 transmits power to the transmission output shaft 13 through the gear transmission pairs. A housing of the differential 40 is fixedly connected to the transmission housing 11. The transmission output shaft 13 is connected to an input shaft of the differential 40 and transmits power to the differential 40. The differential 40 transmits the power acquired from the transmission output shaft 13 to half axles of wheels, so as to drive the wheels to rotate and hence to drive the all-terrain vehicle to move. By changing a transmission ratio of the gear transmission pairs between the transmission input shaft 12 and the transmission output shaft 13, a transmission ratio of the transmission 10 may be changed, such that the all-terrain vehicle can possess a relatively high driving force at different vehicle speeds. In some embodiments of the present disclosure, the first gears are slidably arranged on the transmission input shaft 12, and different first gears may be meshed with the second gears by sliding the first gears, so that the transmission ratio of the transmission is changed. In some embodiments of the present disclosure, the first gears and the second gears keep a meshed state all the time, the second gears are rotatably connected to the transmission output shaft 13, and an engagement sleeve is arranged on the transmission output shaft 13 and slidably connected to the transmission output shaft 13. By sliding the engagement sleeve, different second gears are circumferentially fixed to the transmission output shaft 13, so that different second gears drive the transmission output shaft 13 to rotate, and thus the transmission ratio of the transmission 10 is changed. The transmission housing 11 accommodates a lubricating oil, the first gears and the second gears are immersed in the lubricating oil, and the lubricating oil cyclically flows so as to lubricate all the transmission parts, and also to lower temperatures of all the transmission parts, e.g., temperatures of the first gears and the second gears, thus preventing the first gears and the second gears from an overheat damage. It should be noted that only illustrative descriptions are made for the structure of the transmission 10, and except the manual transmission as described above, the transmission 10 may be other forms of transmissions. For example, the transmission 10 may be an electronic control hydraulic automatic transmission, an electronic control mechanical stepless automatic transmission or a dual-clutch transmission.

The motor 20 includes a motor housing 21, a rotor 22, a stator 23 and a motor output shaft 25. The motor housing 21 has an open end and a closed end opposite to the open end. Specifically, the motor housing 21 is a housing having an opening in one side, the motor housing 21 is connected to an outer surface of the transmission housing 11, and the opening of the motor housing 21 is covered by the outer surface of the transmission housing 11, so that an enclosed accommodating space is formed between the outer surface of the transmission housing 11 and the motor housing 21, i.e., the transmission housing 11 serves as a cover of the motor housing 21, and no additional motor cover is needed. Thus, the power assembly 1 is more compact in structure and smaller in size. The rotor 22 is rotatably arranged in the motor housing 21, the stator 23 is fixed in the motor housing 21, and the stator 23 is arranged on a peripheral outer side of the rotor 22. The stator 23 drives the rotor 22 to rotate under the action of electromagnetic induction, and the rotor 22 is connected to the motor output shaft, so the motor output shaft is driven by the rotor 22 to rotate.

The heat conductive element 30 is arranged between an end of the stator 23 and the transmission housing 11, and transmits heat of the end of the stator 23 to the transmission housing 11, then the transmission housing 11 is cooled by the lubricating oil in the transmission housing 11, and thus the end of the stator 23 is cooled. In some embodiments of the present disclosure, one end of the heat conductive element 30 is in contact with the end of the stator 23, the heat conductive element 30 exchanges heat with the end of the stator 23 by thermal conduction, the other end of the heat conductive element 30 is in contact with the outer surface of the transmission housing 11, and the heat conductive element 30 exchanges heat with the transmission housing 11 by thermal conduction. In some embodiments of the present disclosure, one end of the heat conductive element 30 is in contact with the end of the stator 23, the heat conductive element 30 exchanges heat with the end of the stator 23 by thermal conduction, the other end of the heat conductive element 30 is a preset distance from the outer surface of the transmission housing 11, and the heat conductive element 30 exchanges heat with the outer surface of the transmission housing 11 by thermal convection of air. In some embodiments of the present disclosure, one end of the heat conductive element 30 is a preset distance from the end of the stator 23, the heat conductive element 30 exchanges heat with the end of the stator 23 by thermal convection of air, the other end of the heat conductive element 30 is a preset distance from the outer surface of the transmission housing 11, and the heat conductive element 30 exchanges heat with the outer surface of the transmission housing 11 by thermal convection of air.

By arranging the heat conductive element 30 between the end of the stator 23 and the transmission housing 11, the heat exchange between the end of the stator 23 and the transmission housing 11 is accelerated, thereby ensuring the cooling rate of the end of the stator 23. Thus, the temperature of the end of the stator 23 is prevented from being higher than those of other parts of the stator 23, and the uneven temperature of the stator 23 is avoided. Moreover, by adding a cooling channel of the end of the stator, the cooling efficiency of the motor 10 is further improved. Moreover, the end of the stator 23 does not need to touch a cooling liquid in the transmission housing 11, and thus the stator 23 does not need to possess a cooling liquid resistance. Furthermore, an oil spraying system also does not need to be provided, thereby reducing a manufacturing cost of the power assembly.

In some embodiments, referring to FIG. 1 and FIG. 2, the heat conductive element 30 includes a heat conductive rib 31, the heat conductive rib 31 is arranged on the outer surface of the transmission housing 11 and at a periphery of the through hole, and the heat conductive rib 31 is a preset distance from the end of the stator 23, so that the end of the stator 23 exchanges heat with the heat conductive rib 31 by thermal convection of air, and the heat conductive rib 31 exchanges heat with the transmission housing 11 by thermal conduction. The heat conductive rib has a large contact area with hot air, thereby accelerating the heat exchange between the end of the stator 23 and the heat conductive rib 31, and hence increasing the cooling rate of the end of the stator 23. Thus, the temperature of the end of the stator 23 is prevented from being higher than those of other parts of the stator 23, and the uneven temperature of the stator 23 is avoided.

In some embodiments of the present disclosure, a cooling fan is further arranged to the motor output shaft 25 and rotates along with rotation of the motor output shaft 25, so as to enable the air to flow from the end of the stator 23 to the heat conductive rib 31, thereby accelerating the heat exchange between the end of the stator 23 and the heat conductive rib 31. Thus, the temperature of the end of the stator 23 is prevented from being higher than those of other parts of the stator 23, and the uneven temperature of the stator 23 is avoided.

In some embodiments, as shown in FIG. 2, an accommodating chamber 15 is formed in the outer surface of the transmission housing 11, the through hole is formed in a bottom wall of the accommodating chamber 15, the open end of the motor housing 21 is connected to a peripheral wall of the accommodating chamber 15, and the heat conductive rib 31 is arranged on the bottom wall of the accommodating chamber 15.

Figure 3:
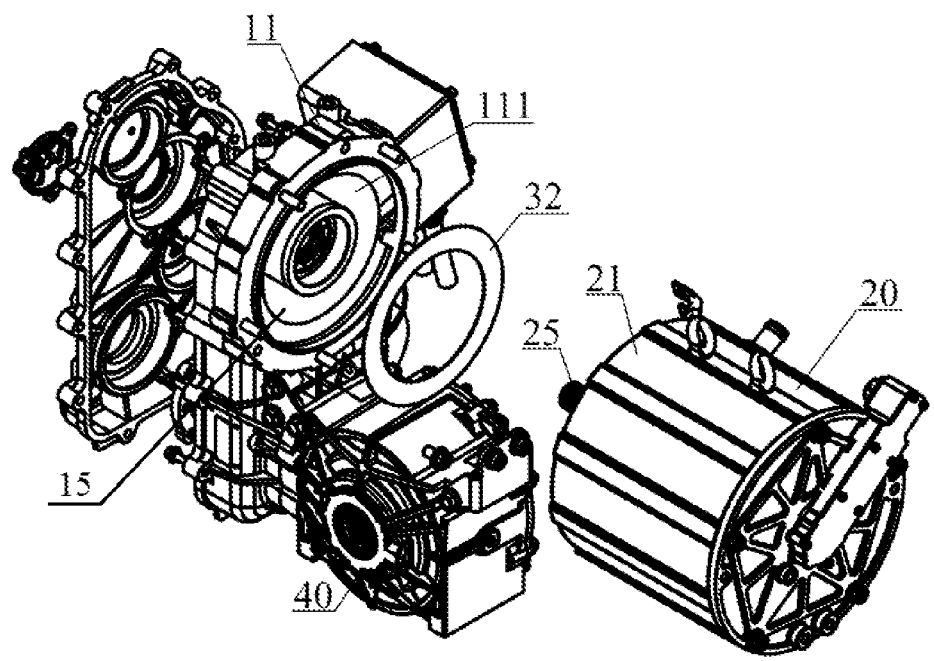
FIG. 3 is an exploded view of a power assembly according to another embodiment of the present disclosure.

In some embodiments, referring to FIG. 1 and FIG. 3, the heat conductive element 30 includes a heat conductive washer 32, one end of the heat conductive washer 32 is in contact with the transmission housing 11, and the other end of the heat conductive washer 32 opposite to the one end of the heat conductive washer 32 is in contact with the end of the stator 23.

Further, a thermal conductivity of the heat conductive washer 32 is higher than that of the air, and the heat conductive washer 32 is made of an insulating material. In some embodiments of the present disclosure, the thermal conductivity of the heat conductive washer is 2 W/(m·K), and the thermal conductivity of the heat conductive washer is 81 times that of the air. The heat conductive washer 32 enables the end of the stator 23 to exchange heat with the transmission housing 11 by thermal conduction. The thermal conductivity of the heat conductive washer 32 is greater than that of the air, thereby accelerating the heat exchange between the end of the stator 23 and the transmission housing 11, and hence increasing the cooling rate of the end of the stator 23. Thus, the temperature of the end of the stator 23 is prevented from being higher than those of other parts of the stator 23, and the uneven temperature of the stator 23 is avoided. Moreover, the heat conductive washer 32 is made of the insulating material, thereby increasing the cooling rate of the end of the stator 23, and also realizing an overall plastic packaging of the end of the stator 23, so as to achieve an electrical isolation between the end of the stator 23 and the transmission housing 11.

Further, as shown in FIG. 3, the heat conductive washer 32 is annular, the transmission housing 11 has a cooling ring face 111 matched with the heat conductive washer 32 in shape, and the heat conductive washer 32 is fitted with the cooling ring face 111, thereby enlarging a contact area between the heat conductive washer 32 and the transmission housing 11, accelerating the heat exchange between the end of the stator 23 and the transmission housing 11, and hence further increasing the cooling rate of the end of the stator 23.

In some embodiments, as shown in FIG. 1, the power assembly further includes the differential 40, and the housing of the differential 40 is fixedly connected to the transmission housing 11.

Further, the accommodating chamber 15 is formed in the outer surface of the transmission housing 11, the through hole is formed in the bottom wall of the accommodating chamber 15, the open end of the motor housing 21 is connected to the peripheral wall of the accommodating chamber, and the cooling ring face 111 is arranged on the bottom wall of the accommodating chamber 15. Further, referring to FIG. 1 and FIG. 3, the heat conductive washer 32 covers the end of the stator 23, thereby increasing the cooling rate of the end of the stator 23, and also realizing the overall plastic packaging of the end of the stator 23, so as to realize the electrical isolation between the end of the stator 23 and the transmission housing 11.

Figure 4:
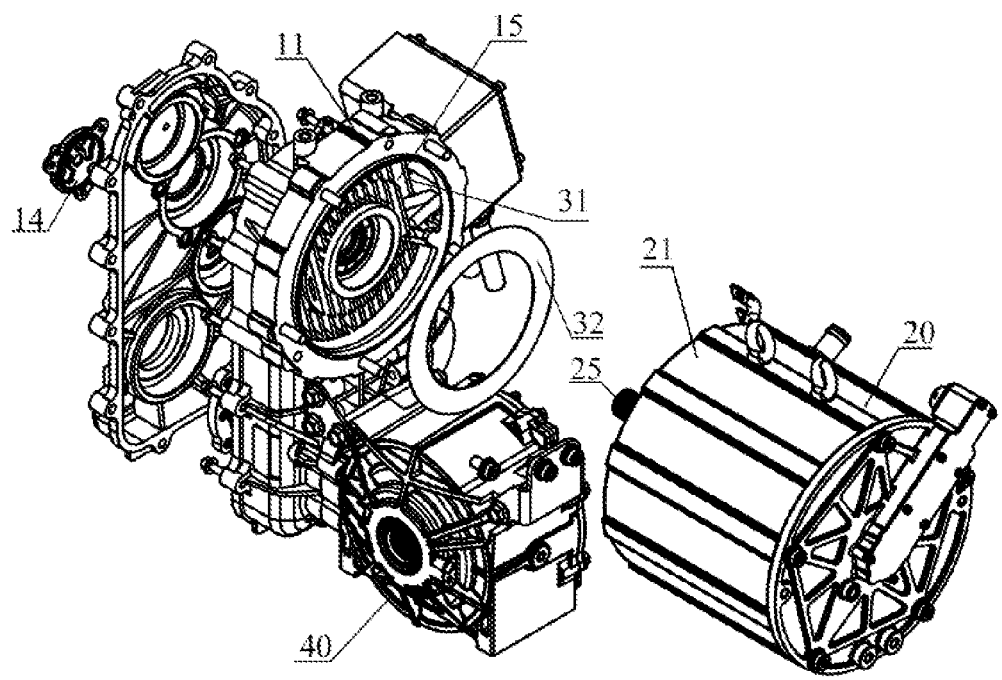
FIG. 4 is an exploded view of a power assembly according to another embodiment of the present disclosure.

In some embodiments, referring to FIG. 1 and FIG. 4, the heat conductive element 30 includes the heat conductive rib 31 and the heat conductive washer 32, the heat conductive rib 31 is fixed to the outer surface of the transmission housing 11, the first end of the heat conductive washer 32 is in contact with the heat conductive rib 31, and the second end of the heat conductive washer 32 opposite to the first end of the heat conductive washer 32 is in contact with the end of the stator 23. A part, in contact with the heat conductive rib 31, of the first end of the heat conductive washer 32 exchanges heat with the heat conductive rib 31 by thermal conduction, and another part, not in contact with the heat conductive rib 31, of the first end of the heat conductive washer 32 exchanges heat with the transmission housing 11 by thermal convection of air, i.e., the end of the stator 23 exchanges heat with the transmission housing 11 by thermal conduction and by thermal convection of air at the same time, thereby further increasing the cooling rate of the end of the stator 23. Thus, the temperature of the end of the stator 23 is prevented from being higher than those of other parts of the stator 23, and the uneven temperature of the stator 23 is avoided. Further, a plurality of heat conductive ribs 31 are provided, i.e., the plurality of heat conductive ribs 31 are arranged on the outer surface of the transmission housing 11 and surround the through hole, thereby enlarging a contact area between the heat conductive washer 32 and the heat conductive ribs 31, and also enlarging the contact area between the heat conductive ribs 31 and the hot air, so as to further increase the cooling rate of the end of the stator 23, and to avoid the uneven temperature of the stator 23.

Figure 5:
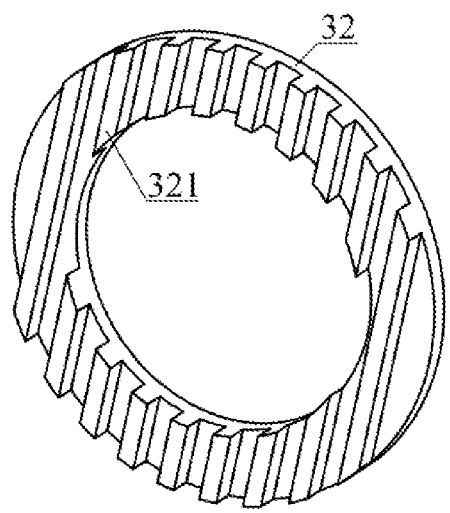
FIG. 5 is a schematic view of a heat conductive washer in a power assembly according to an embodiment of the present disclosure.

Further, referring to FIG. 4 and FIG. 5, a heat conductive boss 321 fitted with the heat conductive rib 31 is arranged on the end of the heat conductive washer 32 in contact with the heat conductive rib 31. In the case that the plurality of heat conductive ribs 31 are provided at intervals, a plurality of heat conductive bosses 321 are also provided at intervals, and the heat conductive bosses 321 that are arranged at intervals and the heat conductive ribs 31 that are arranged at intervals are fitted in an alternated manner and in contact with each other. By providing the heat conductive boss 321 on the end of the heat conductive washer 32 in contact with the heat conductive rib 31, the contact area between the heat conductive washer 32 and the heat conductive rib 31 is enlarged, thus accelerating the thermal conduction between the heat conductive washer 32 and the heat conductive rib 31. Therefore, the cooling rate of the end of the stator 23 is increased, and the uneven temperature of the stator 23 is avoided.

Figure 6:
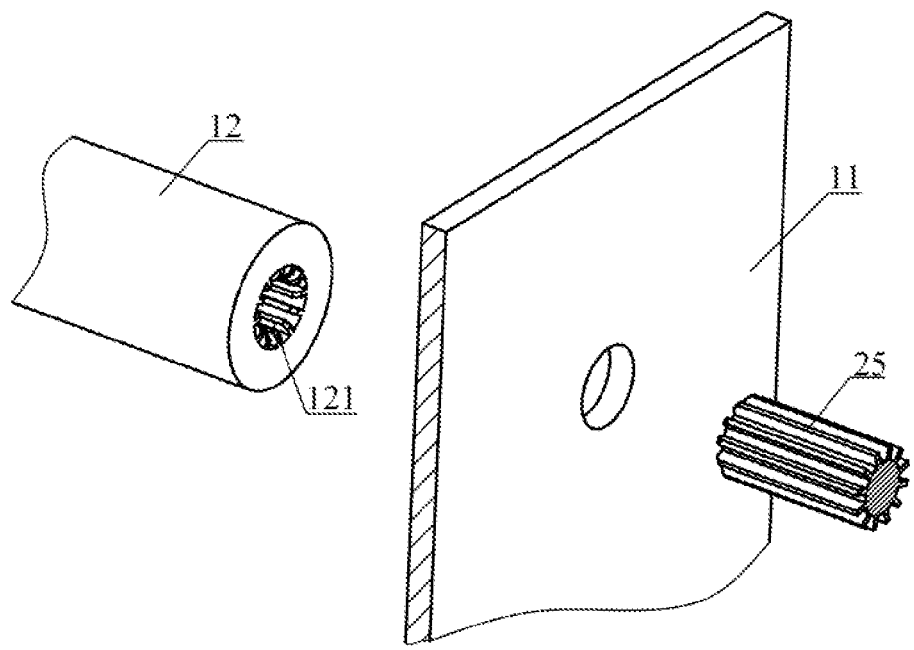
FIG. 6 is an assembly view of a transmission input shaft, a transmission housing and a motor output shaft in a power assembly according to an embodiment of the present disclosure.

In some embodiments, an input end of the transmission input shaft 12 blocks the through hole of the transmission housing 11. The input end of the transmission input shaft 12 is just an end of the transmission input shaft 12 connected to the motor output shaft 25. Specifically, as shown in FIG. 6, an overall dimension (for example, an outer diameter) of the input end of the transmission input shaft 12 is greater than an overall dimension (for example, an inner diameter) of the through hole of the transmission housing 11, thereby preventing the lubricating oil in the transmission housing 11 from flowing out of the through hole. A spline hole 121 is formed in the input end of the transmission input shaft 12, and an overall dimension (for example, an inner diameter) of the spline hole 121 is not greater than that of the through hole of the transmission housing 11. An end of the motor output shaft 25 passes through the through hole to be inserted in the spline hole 121, and a spline is arranged on the end of the motor output shaft 25 to enable the motor output shaft to be circumferentially connected to the transmission input shaft 12, so as to drive the transmission input shaft 12 to rotate.

In some embodiments, as shown in FIG. 4, the transmission 20 further includes a lubricating oil pump 14, the lubricating oil in the transmission housing 11 is driven by the lubricating oil pump 14 to cyclically flow in the lubricating oil pump 14, and heat is distributed evenly in the lubricating oil due to the flow of the lubricating oil, thereby preventing heat from being concentrated in a certain part of the transmission 20, and increasing a cooling rate of the lubricating oil. Thus, the cooling rate of the end of the stator 23 is increased, and the uneven temperature of the stator 23 is avoided. Further, a movement speed of a drive part in the lubricating oil pump 14 is positively correlated with a rotation speed of the motor output shaft 25, i.e., the movement speed of the drive part of the lubricating oil pump 14 is regulated according to the rotation speed of the motor output shaft 25, thereby controlling a cyclical flow speed of the lubricating oil in the transmission housing 11, and the higher the rotation speed of the motor output shaft 25 is, the higher the cyclical flow speed of the lubricating oil is. In some embodiments of the present disclosure, the lubricating oil pump 14 is a gear pump, the drive part in the lubricating oil pump 14 includes two meshed drive gears, namely a driving gear and a driven gear, and the drive gears rotate to squeeze the lubricating oil out of the lubricating oil pump 14, thereby driving the lubricating oil to cyclically flow. Rotation speeds of the drive gears are positively correlated with the rotation speed of the motor output shaft 25. In some embodiments of the present disclosure, the lubricating oil pump 14 is a piston pump, the drive part in the lubricating oil pump 14 is a drive piston, and the drive piston reciprocates linearly to drive the lubricating oil to cyclically flow. Taking that the lubricating oil pump 14 is the gear pump as the example, illustrative descriptions are made for the implementation mode of enabling the rotation speed of the gear pump to be positively correlated with the rotation speed of the motor output shaft 25 as follows.

In some embodiments of the present disclosure, the driving gear in the lubricating oil pump 14 is connected to the transmission input shaft 12 through a mechanical transmission structure, i.e., the driving gear in the lubricating oil pump 14 acquires power from the transmission input shaft 12 through the mechanical transmission structure so as to drive the lubricating oil to cyclically flow, the rotation speed of the driving gear is positively correlated with the rotation speed of the transmission input shaft 12, and the rotation speed of the transmission input shaft 12 is identical with the rotation speed of the motor output shaft 25, so that the rotation speed of the lubricating oil pump 14 is positively correlated with the rotation speed of the motor output shaft 25.

In some embodiments of the present disclosure, the gear pump further includes a drive motor, a motor driver and a rotation speed sensor. The drive motor is connected to a storage battery of the all-terrain vehicle to acquire electric energy, an output shaft of the drive motor is connected to the driving gear of the gear pump to drive the driving gear to rotate, the rotation speed sensor is configured to get the rotation speed of the transmission input shaft, the rotation speed sensor is connected to the motor driver and transmits data of the rotation speed of the transmission input shaft to the motor driver, and the motor driver controls the rotation speed of the output shaft of the drive motor according to the got rotation speed of the transmission input shaft, thereby controlling the rotation speed of the driving gear of the gear pump, i.e., controlling the rotation speed of the driving gear of the gear pump according to the rotation speed of the transmission input shaft, and hence enabling the rotation speed of the lubricating oil pump 14 to be positively correlated with the rotation speed of the motor output shaft 25.

In some embodiments, the lubricating oil pump is an individual pump, i.e., the lubricating oil pump is a pump integrating an internal power supply, or the lubricating oil pump directly acquires electric energy from a battery module of the vehicle, thereby allowing the rotation speed of the lubricating oil to be constant and not correlated with the rotation speed of the motor output shaft.

In some embodiments, as shown in FIG. 4, the outer surface of the transmission housing 11 is recessed to form the accommodating chamber 15, the accommodating chamber 15 is configured to accommodate the end of the stator 23, and the heat conductive rib 31 is arranged on a chamber wall of the accommodating chamber 15. The accommodating chamber 15 is formed to enlarge a surface area of the heat conductive rib 31, thereby accelerating the heat exchange between the end of the stator 23 and the heat conductive rib 31. Thus, the cooling rate of the end of the stator 23 is further increased, and the uneven temperature of the stator 23 is avoided. In some embodiments of the present disclosure, one end of the motor housing 21 is an open end, an overall dimension (for example, an inner diameter) of the accommodating chamber 15 is equal to an overall dimension (for example, an outer diameter) of the open end of the motor housing 21, the open end of the motor housing 21 abuts against the accommodating chamber 15, and the wall surface of the accommodating chamber 15 covers an opening of the motor housing 21, thereby preventing dust or liquid drops from entering the motor through the opening of the motor housing 21 and adhering to the rotor 22 or the stator 23, and hence prolonging the service life of the motor 20. Meanwhile, the accommodating chamber is formed to reduce the dimension of the power assembly 1 in an axial direction of the motor output shaft 25, thereby making the structure of the power assembly 1 more compact, and hence facilitating the arrangement of the power assembly 1 in the all-terrain vehicle.

Figure 7:
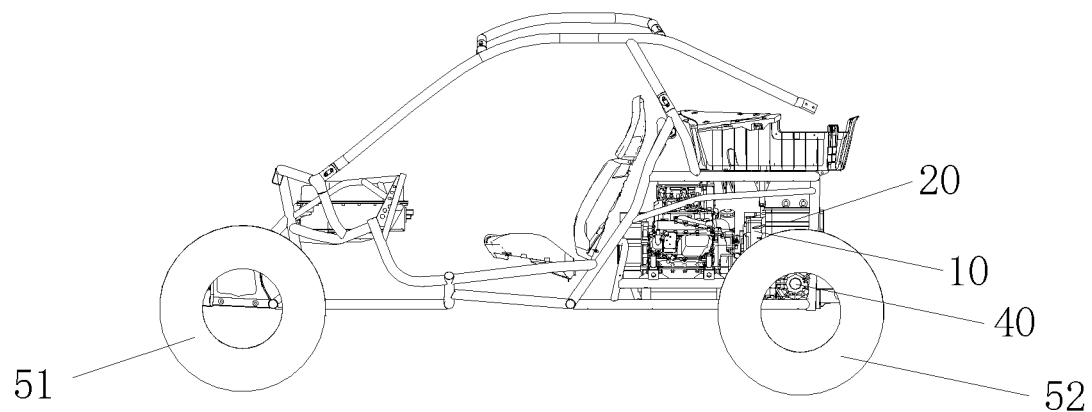
FIG. 7 is a schematic view of an all-terrain vehicle according to an embodiment of the present disclosure.

Embodiments of the present disclosure further provide an all-terrain vehicle 1000, as shown in FIG. 7. The all-terrain vehicle 1000 includes a wheel and the power assembly according to the above embodiments of the present disclosure. The power assembly is connected to the wheel and configured to drive the wheel to rotate.

The wheel includes a front wheel 51 and a rear wheel 52, and the differential 40 is connected to the rear wheel 52, so as to drive the rear wheel 52 to rotate and hence to drive the all-terrain vehicle 1000 to move.

The foregoing description includes only illustrative embodiments of the present disclosure, but not to limit the protection scope of the present disclosure.

What is claimed is:

1. A power assembly, comprising:
 a transmission comprising a transmission housing and a transmission input shaft rotatably connected to the transmission housing, the transmission housing having a through hole;
 a motor comprising:
  a motor housing having an open end and a closed end opposite to the open end, and the open end being connected to the transmission housing;
  a rotor rotatably arranged in the motor housing;

a motor output shaft having an end connected to the rotor and another end passing through the through hole to be connected to the transmission input shaft; and a stator fixed in the motor housing and arranged on a peripheral outer side of the rotor; and a heat conductive element arranged between an end of the stator and the transmission housing, wherein the heat conductive element comprises a heat conductive washer, one end of the heat conductive washer is in contact with the transmission housing, and the other end of the heat conductive washer opposite to the one end of the heat conductive washer is in contact with the end of the stator, wherein the heat conductive washer is annular, the transmission housing has a cooling ring face matched with the heat conductive washer in shape, and the heat conductive washer is fitted with the cooling ring face.

2. The power assembly according to claim 1, wherein the heat conductive element has a first end and a second end, the first end of the heat conductive element is configured in one manner of being in contact with the end of the stator and being a preset distance from the end of the stator, and the second end of the heat conductive element is configured in one manner of being in contact with the transmission housing and being a preset distance from the transmission housing.

3. The power assembly according to claim 1, wherein a thermal conductivity of the heat conductive washer is higher than a thermal conductivity of air, and the heat conductive washer is made of an insulating material.

4. The power assembly according to claim 1, wherein an accommodating chamber is formed in an outer surface of the transmission housing, the through hole is formed in a bottom wall of the accommodating chamber, the open end of the motor housing is connected to a peripheral wall of the accommodating chamber, and the cooling ring face is arranged on the bottom wall of the accommodating chamber.

5. The power assembly according to claim 1, further comprising a differential connected to the transmission, and a housing of the differential being fixedly connected to the transmission housing.

6. The power assembly according to claim 1, wherein an overall dimension of an input end of the transmission input shaft is greater than an overall dimension of the through hole of the transmission housing.

7. The power assembly according to claim 6, wherein a spline hole is formed in the input end of the transmission input shaft, and an overall dimension of the spline hole is less than or equal to the overall dimension of the through hole of the transmission housing.

8. The power assembly according to claim 7, wherein an end of the motor output shaft passes through the through hole to be inserted in the spline hole, and is provided with a spline fitted in the spline hole.

9. The power assembly according to claim 1, wherein the transmission further comprises a lubricating oil pump, and the lubricating oil pump is configured to drive a lubricating oil in the transmission housing to cyclically flow in the lubricating oil pump.

10. The power assembly according to claim 9, wherein a movement speed of a drive part in the lubricating oil pump is positively correlated with a rotation speed of the motor output shaft.

11. A power assembly, comprising:
a transmission comprising a transmission housing and a transmission input shaft rotatably connected to the transmission housing, the transmission housing having a through hole;
a motor comprising:
a motor housing having an open end and a closed end opposite to the open end, and the open end being connected to the transmission housing;
a rotor rotatably arranged in the motor housing;
a motor output shaft having an end connected to the rotor and another end passing through the through hole to be connected to the transmission input shaft; and
a stator fixed in the motor housing and arranged on a peripheral outer side of the rotor; and
a heat conductive element arranged between an end of the stator and the transmission housing,
wherein the heat conductive element comprises:
at least one heat conductive rib fixed to an outer surface of the transmission housing; and
a heat conductive washer, one end of the heat conductive washer being in contact with the at least one heat conductive rib, and the other end of the heat conductive washer opposite to the one end of the heat conductive washer is in contact with the end of the stator.

12. The power assembly according to claim 11, wherein an end of the heat conductive washer in contact with the at least one heat conductive rib has a heat conductive boss fitted with the at least one heat conductive rib.

13. The power assembly according to claim 12, wherein a plurality of heat conductive ribs are provided at intervals, a plurality of heat conductive bosses are provided at intervals, and the plurality of heat conductive bosses and the plurality of heat conductive ribs are fitted in an alternated manner and in contact with each other.

14. The power assembly according to claim 11, wherein an accommodating chamber is formed in the outer surface of the transmission housing, the through hole is formed in a bottom wall of the accommodating chamber, the open end of the motor housing is connected to a peripheral wall of the accommodating chamber, the at least one heat conductive rib is arranged on the bottom wall of the accommodating chamber, and the heat conductive washer are arranged on the least one heat conductive rib.

15. An all-terrain vehicle, comprising:
a wheel; and
a power assembly connected to the wheel and configured to drive the wheel to rotate,
wherein the power assembly comprises:
a transmission comprising a transmission housing and a transmission input shaft rotatably connected to the transmission housing, the transmission housing having a through hole;
a motor comprising:
a motor housing having an open end and a closed end opposite to the open end, and the open end being connected to the transmission housing;
a rotor rotatably arranged in the motor housing;
a motor output shaft having an end connected to the rotor and another end passing through the through hole to be connected to the transmission input shaft; and
a stator fixed in the motor housing and arranged on a peripheral outer side of the rotor; and
a heat conductive element arranged between an end of the stator and the transmission housing, wherein the heat conductive element comprises a heat conductive washer, one end of the heat conductive washer is in contact with the transmission housing, and the other end of the heat conductive washer opposite to the one end of the heat conductive washer is in contact with the end of the stator, wherein the heat conductive washer is annular, the transmission housing has a cooling ring face matched with the heat conductive washer in shape, and the heat conductive washer is fitted with the cooling ring face.

16. The all-terrain vehicle according to claim 15, wherein the wheel comprises a front wheel and a rear wheel, the power assembly further comprises a differential connected to the transmission, and the differential is connected to the rear wheel to drive the rear wheel to rotate.

\* \* \* \* \*